(12) United States Patent
Komiya

(10) Patent No.: US 8,285,039 B2
(45) Date of Patent: Oct. 9, 2012

(54) IMAGE PROCESSOR

(75) Inventor: Yasuhiro Komiya, Tokyo (JP)

(73) Assignee: Olympus Corporation, Tokyo (JP)

( * ) Notice: Subject to any disclaimer, the term of this patent is extended or adjusted under 35 U.S.C. 154(b) by 1112 days.

(21) Appl. No.: 11/901,474

(22) Filed: Sep. 17, 2007

(65) Prior Publication Data

US 2008/0069482 A1    Mar. 20, 2008

(30) Foreign Application Priority Data

Sep. 20, 2006 (JP) ............... P2006-254460

(51) Int. Cl.
*G06K 9/00* (2006.01)
*G06K 9/66* (2006.01)
*G06K 9/40* (2006.01)

(52) U.S. Cl. ............. 382/167; 382/195; 382/274

(58) Field of Classification Search .......... 382/165, 382/167, 190, 192, 195, 206, 274, 275
See application file for complete search history.

(56) References Cited

U.S. PATENT DOCUMENTS

| | | | |
|---|---|---|---|
| 4,126,395 A * | 11/1978 | Ross et al. ............. 356/613 |
| 5,766,006 A | 6/1998 | Murljacic |
| 6,054,846 A | 4/2000 | Castleman |
| 6,061,091 A * | 5/2000 | Van de Poel et al. ...... 348/241 |
| 6,210,159 B1 | 4/2001 | Lehmann et al. |
| 6,575,751 B1 | 6/2003 | Lehmann et al. |
| 6,718,051 B1 * | 4/2004 | Eschbach ............... 382/117 |
| 6,786,726 B2 | 9/2004 | Lehmann et al. |
| 7,136,537 B2 * | 11/2006 | Pilu et al. ............... 382/274 |
| 7,551,800 B2 * | 6/2009 | Corcoran et al. ......... 382/275 |
| 7,596,253 B2 * | 9/2009 | Wong et al. ............. 382/128 |
| 7,675,652 B2 * | 3/2010 | Demandolx et al. ...... 358/3.26 |
| 7,756,327 B2 | 7/2010 | Komiya et al. |
| 7,876,955 B2 | 1/2011 | Komiya et al. |

(Continued)

FOREIGN PATENT DOCUMENTS

JP    05-314257 A    11/1993

(Continued)

OTHER PUBLICATIONS

Japanese Office Action dated Sep. 6, 2011 (and English translation thereof) in counterpart Japanese Application No. 2006-254460.

(Continued)

*Primary Examiner* — Aaron W Carter
(74) *Attorney, Agent, or Firm* — Holtz, Holtz, Goodman & Chick, PC

(57) ABSTRACT

An image storage portion 31 stores image data that is input. An outline detecting portion 32 detects an outline of tooth that is the object of color measurement in the image based on the image data. A specular reflection region detecting portion 33 detects the position of a specular reflection region in the tooth that is the object of color measurement based on the data of each pixel that constitutes the image. A rectangular region setting portion 34 sets an analysis region to become the object of analysis processing in the image based on the position of the specular reflection region that is detected by the specular reflection region detecting portion 33. In accordance with the present invention, it is possible to avoid setting an analysis region in a specular reflection region when setting an analysis region, that is the object of analysis processing of an image, in the image.

12 Claims, 5 Drawing Sheets

U.S. PATENT DOCUMENTS

| | | | |
|---|---|---|---|
| 2002/0064750 A1 | 5/2002 | Morris et al. | |
| 2002/0064751 A1 | 5/2002 | Lehmann | |
| 2002/0172432 A1* | 11/2002 | Pilu et al. | 382/274 |
| 2003/0190578 A1 | 10/2003 | Lehmann | |
| 2005/0003329 A1 | 1/2005 | Lehmann et al. | |
| 2005/0094895 A1* | 5/2005 | Baron | 382/275 |
| 2005/0118549 A1 | 6/2005 | Lehmann | |
| 2008/0069433 A1* | 3/2008 | Corcoran et al. | 382/149 |
| 2008/0069482 A1* | 3/2008 | Komiya | 382/307 |
| 2008/0075385 A1* | 3/2008 | David et al. | 382/275 |
| 2008/0080785 A1* | 4/2008 | Ford | 382/275 |
| 2008/0170764 A1* | 7/2008 | Burns et al. | 382/128 |
| 2008/0192235 A1 | 8/2008 | Komiya et al. | |
| 2009/0028461 A1* | 1/2009 | Wieringa et al. | 382/284 |
| 2009/0169112 A1* | 7/2009 | Inoue et al. | 382/199 |
| 2009/0280455 A1 | 11/2009 | Lehmann et al. | |

FOREIGN PATENT DOCUMENTS

| | | |
|---|---|---|
| JP | 09-210785 A | 8/1997 |
| JP | 2000-242791 A | 9/2000 |
| JP | 2001-066187 A | 3/2001 |
| JP | 2002-163649 A | 6/2002 |
| JP | 2002-528832 A | 9/2002 |
| JP | 2004-077501 A | 3/2004 |
| WO | WO 00/26847 A1 | 5/2000 |
| WO | WO 02/12847 A1 | 2/2002 |
| WO | WO 2004/036162 A1 | 4/2004 |

OTHER PUBLICATIONS

Extended European Search Report (EESR) dated Jun. 13, 2012 (in English) in counterpart European Application No. 07018096.3.

James Fondriest: "Shade Matching in Restorative Dentistry: The Science and Strategies": Jun. 29, 2006: XP002676950.

Japanese Office Action dated May 8, 2012 (and English translation thereof) in counterpart Japanese Application No. 2006-254460.

Japanese Notice of Allowance dated Jul. 31, 2012 (and English translation thereof) in counterpart Japanese Application No. 2006-254460.

* cited by examiner $a = A/4$, $b = B/4$

US 8,285,039 B2

IMAGE PROCESSOR

BACKGROUND OF THE INVENTION

1. Field of the Invention

The present invention relates to an image processor that performs analysis processing of an image based on data of an analysis region that is set within the image.

Priority is claimed on Japanese Patent Application No. 2006-254460, filed Sep. 20, 2006, the content of which is incorporated herein by reference.

2. Description of Related Art

In the field of dentistry there is performed treatment by a ceramic crown method or the like. The ceramic crown method involves creating a crown of a color approximating the color of the original tooth of the patient (ceramic tooth crown prosthetic appliance), and capping the patient's tooth with this crown. In treatment by the ceramic crown method, it is therefore necessary to fabricate a crown that is the prosthetic appliance.

U.S. Pat. No. 5,766,006 discloses a tooth analyzing system that is provided with a camera for illuminating and imaging the patient's tooth and an analyzing apparatus that compares the color value of the image of the patient's tooth obtained by the imaging to color values of tooth shades and identifies a tooth shade that suitably matches the patient's tooth. In the tooth image analysis there is disclosed art of positioning in the image a rectangle indicating a range to become the object of measurement and measuring the color within the range of this rectangle. Also, Japanese Unexamined Patent Application, First Publication No. H05-314257 discloses art of automatically moving a rectangular region for calculating the centroid coordinate value of an object in relation to art of a robotic control.

SUMMARY OF THE INVENTION

A first aspect of the present invention is an image processor that, based on data of an analysis region in an image, performs analysis processing of the image which includes: a region detecting portion that, based on data of each pixel that constitutes the image, detects the position of a specular reflection region in the image; and a region setting portion that, based on the position of the detected specular reflection region, sets the analysis region.

Also, in accordance with a second aspect of the image processor of the present invention, the region setting portion sets the analysis region so that the specular reflection region and the analysis region do not overlap.

Also, in accordance with a third aspect of the image processor of the present invention, the region setting portion sets the analysis region by moving a predetermined region that is set in advance within the image.

Also, in accordance with a fourth aspect of the image processor of the present invention, the region setting portion sets the analysis region by altering the size of a predetermined region that is set in advance.

Also, in accordance with a fifth aspect of the image processor of the present invention, when a value that the data of each pixel shows exceeds a threshold value, the region detecting portion detects that pixel relating to the data as a pixel in the specular reflection region.

Also, in accordance with a sixth aspect of the image processor of the present invention, the region detecting portion sets the threshold value based on statistics of data of each pixel.

DETAILED DESCRIPTION OF THE INVENTION

Figure 1:
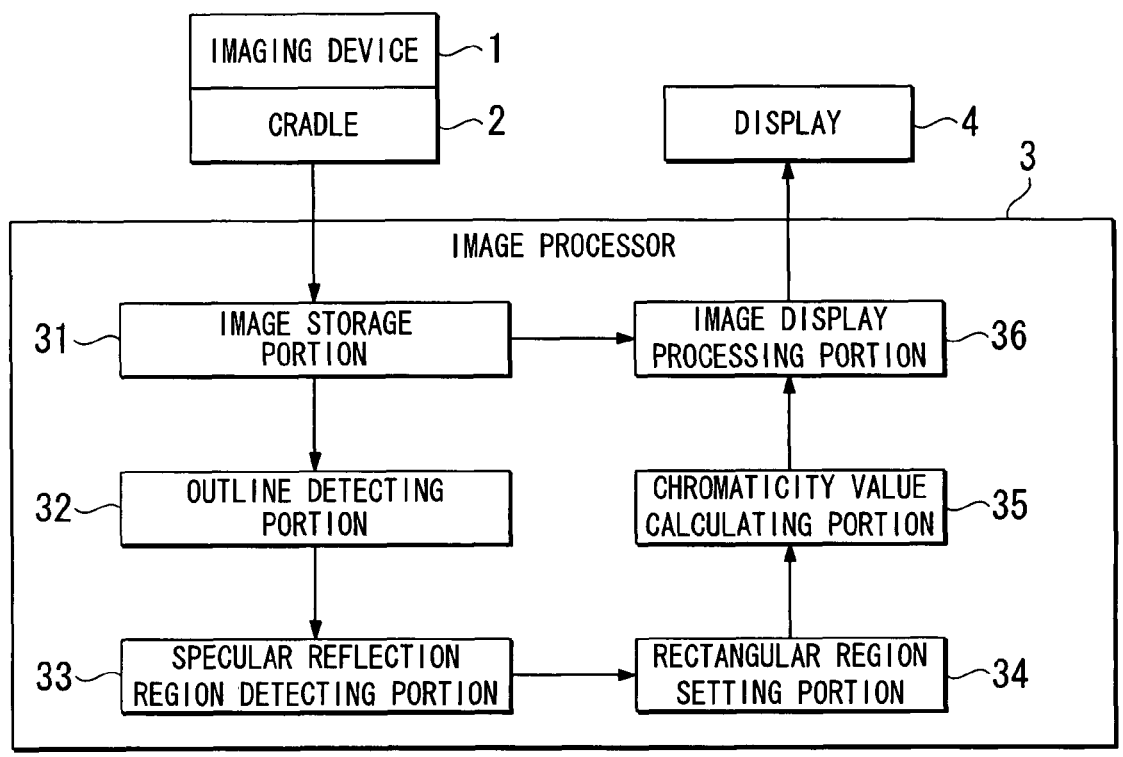
FIG. 1 is a block diagram that shows the constitution of a dental color measuring system in accordance with an embodiment of the present invention.

An embodiment of the present invention is described hereinbelow with reference to the drawings. FIG. 1 shows the constitution of a dental color measuring system in accordance with an embodiment of the present invention. The dental color measuring system includes an imaging device 1, a cradle 2, an image processor 3, and a display 4. The imaging device 1 performs multiband image acquisition by sequentially irradiating illumination light consisting of four or more kinds of wavelength bands (multiband illumination light) on photographic subjects (a patient's teeth) and capturing spectral images of each photographic subject as still images, with the number of spectral images corresponding to the number of types of wavelength bands that the illumination light consists of. In the present embodiment, the description is given for the case of the illumination light having seven kinds of wavelength bands, with the object spectral images of each photographic subject that are captured as still images therefore numbers seven. However, the embodiment is not restricted to this, provided there are four or more kinds of wavelength bands. In addition, the imaging device 1 is capable of capturing RGB images. The cradle 2 is capable of electrical connection with the imaging device 1, and supports the imaging device 1. The image processor 3 includes an image storage portion 31, an outline detecting portion 32, a specular reflection region detecting portion 33 as a region detecting portion, a rectangular region setting portion 34 as a region setting portion, a chromaticity value calculating portion 35, and an image display processing part 36.

Image data that is generated by the imaging device 1 by multiband imaging is input to the image processor 3 via the cradle 2. In the image processor 3, the image storage portion 31 stores image data that has been input. In addition to the tooth that serves as the object of color measurement, information relating to neighboring teeth and gums and the like is also contained in the multiband image data that is taken by the imaging device 1. The outline detecting portion 32 detects the outline of the tooth that is the object of color measurement in the image based on this image data.

The specular reflection region detecting portion 33 detects the position of a specular reflection region in the image of the tooth that is the object of color measurement based on the data of each pixel that constitutes the image. The specular reflection region is a region in which the illumination light specularly reflects from the tooth surface. However, a region which, even if not specularly reflective, is of a brightness that influences the accuracy of subsequent color measurement processing shall be included in the concept of a specular reflection region. Although described in detail below, in the case of the values that the data of each pixel in an image shows exceed a threshold value during the detection of a specular reflection region, that pixels relating to the data are detected as pixels in a specular reflection region.

The aforesaid threshold value may be set in a fixed manner, but in the case of a signal value of the image data increasing or decreasing as a whole, the aforesaid threshold value may be set based on statistics (average and standard deviation) of the data of the pixels in the image. For example, in the case of outside light being incident on the imaging device 1, the signal value of the image data can rise as a whole. In such a case, when the threshold value is fixed, a region which should not be extracted may be falsely recognized as a specular reflection region. On the other hand, when the quantity of illumination light from the imaging device 1 falls due to changes over time, signal value of the image data decreases as a whole. In this case as well, when the threshold value is fixed, a region which should be extracted may not be recognized as a specular reflection region. For this reason, by setting the threshold value based on statistics of the date of the pixels, it is possible to accurately recognize a specular reflection region.

The rectangular region setting portion 34 sets analysis regions to become the object of analysis processing (color measurement processing in the present embodiment) in the image based on the position of specular reflection regions that are detected by the specular reflection region detecting portion 33. The analysis regions are set as rectangular regions in the cervical, body and incisal portions of a tooth surface. Although described in detail below, when setting the rectangular regions, they are set so that the specular reflection regions and the rectangular regions do not overlap. Also, the rectangular regions are set by moving predetermined rectangular regions that are set in advance or altering the size of predetermined rectangular regions.

The chromaticity value calculating portion 35 calculates L*a*b*, which is a chromaticity value in the rectangular regions that have been set (color measurement process). The image display processing part 36, based on the multiband image data that is stored in the image storage portion 31, generates RGB image data which can be displayed by the display 4 and outputs the data for displaying a color image of the photographic subject together with the chromaticity value to the display 4. The display 4 displays the color image and the chromaticity value. Note that, although not illustrated, the image processor 3 is also capable of performing a process to select a tooth shade (shade guide) with a color tone closest to the vital teeth of the patient from among a plurality of sample shade guide of mutually differing color tones.

Figure 2:
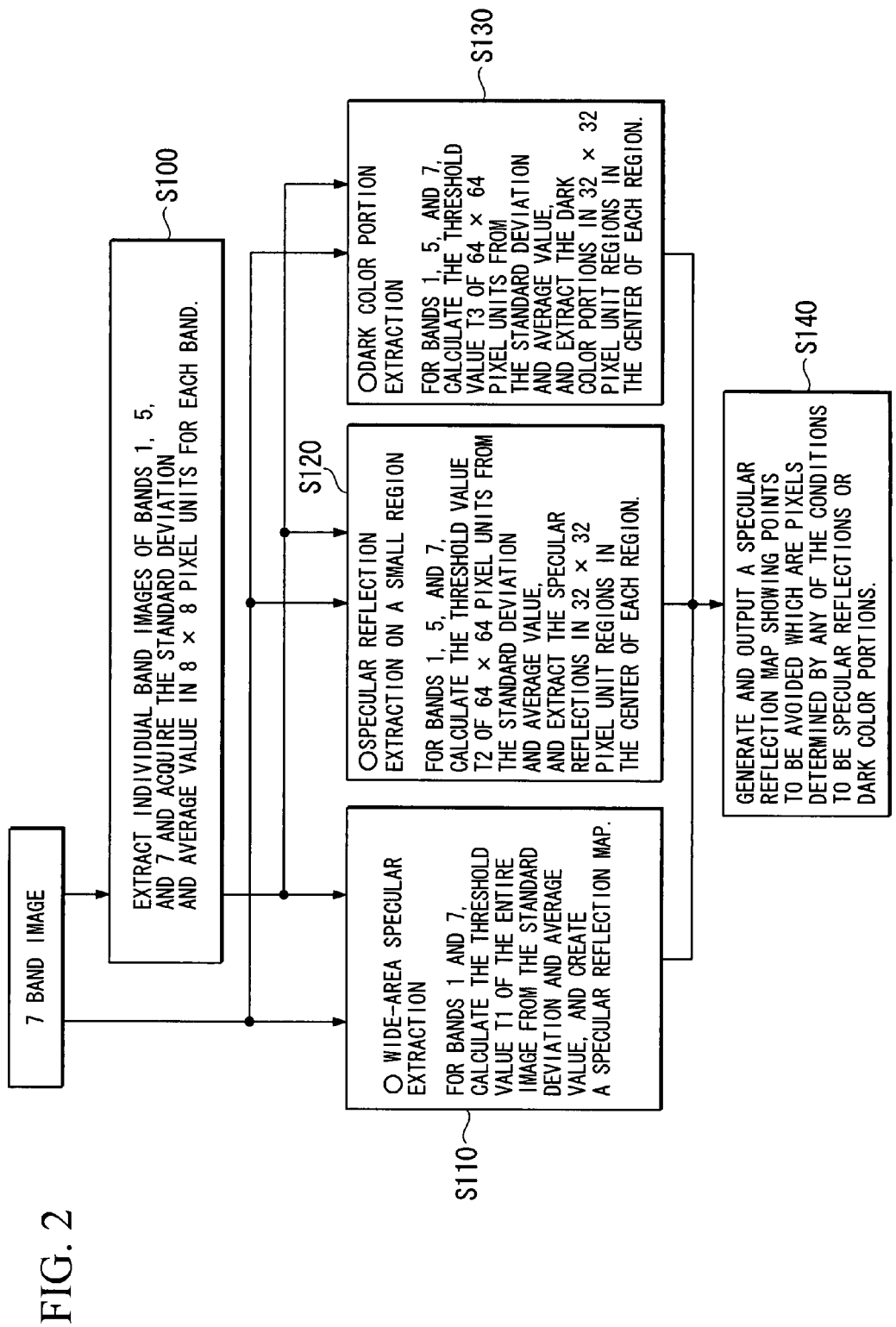
FIG. 2 is an explanatory diagram for explaining the method of detecting a specular reflection region in accordance with an embodiment of the present invention.

Next, the method of detecting a specular reflection region shall be described (referring to FIG. 2). The specular reflection region detecting portion 33 detects the position of specular reflection regions and generates a specular reflection map that shows the distribution of the positions of specular reflection regions in the image. In the present embodiment, extraction of specular reflection regions is performed by selecting three bands, namely, Band 1 (B), Band 5 (G) and Band 7 (R) from seven bands. Band 1 is required for color extraction, and there are specular reflection regions that can only be extracted with Band 1. With Band 5, the distinction between teeth and gums is clearest, and the majority of specular reflection regions on a tooth can be extracted. With Band 7, since there is hardly any distinction between teeth and gums, wide-area specular reflection extraction efficiency is good on gums. In the case of the photographic subject being something other than a patient's teeth, extraction of specular reflection regions may be performed by selecting bands other than the three bands stated above.

First, image data of the aforementioned three bands is extracted from the seven bands of image data, the image of each band is divided into 8×8 pixel regions, and the standard deviation and average of pixel values are calculated for each region (step S100). This is a preprocess with the object of speeding up the processing. Next, as wide-area specular reflection extraction, the standard deviation and average of pixel values of the entire image are calculated for Band 1 and Band 7, and from those values a threshold value T1 is calculated for extracting specular reflection regions. Then, the pixel value of each pixel is compared with the threshold value T1, and pixels having pixel values that exceed the threshold value T1 are extracted as pixels in specular reflection regions, and a specular reflection map is generated (step S110).

Also, as specular reflection extraction on a small region, for Bands 1, 5, and 7, each image is divided into regions of 64×64 pixels and the standard deviation and average of pixel values are calculated for each region, and a threshold value T2 is calculated for each region from those values. Then, using the calculated threshold value T2, the pixels in specular reflection regions are similarly extracted in a 32×32 pixel region in the center of each region, and a specular reflection map is generated (step S120).

Moreover, as dark color portion extraction, for Bands 1, 5, and 7, each image is divided into regions of 64×64 pixels and the standard deviation and average of pixel values are calculated for each region, and a threshold value T3 is calculated for each region from those values. Then, using the calculated threshold value T3, the pixels in a dark color portion are similarly extracted in a 32×32 pixel region in the center of each region, and a dark color portion map is generated (step S130). When extracting the pixels in a dark color portion, conversely to when extracting the pixels in a specular reflection region, pixels having pixel values that do not exceed the threshold value T3 are extracted.

Then, data that shows the positions of pixels excluding pixels extracted as pixels in the specular reflection regions or dark color regions in steps S110 to S130 are generated as a specular reflection map and output to the rectangular region setting portion 34 (step S140). Note that data that shows the positions of pixels extracted as pixels in the specular reflection regions or dark color regions in steps S110 to S130 may be a specular reflection map.

In the extraction of the specular reflection regions of 64×64 pixel units, for example in the case of all of the 64×64 pixels being a specular reflection regions, since it cannot be recognized as a specular reflection region, wide-area specular reflection extraction is necessary. On the other hand, since it is not possible to extract the specular reflection region of a comparatively dark portion of a tooth with only wide-area specular reflection extraction, specular reflection extraction over a small area is necessary. Also, the reason that image data of Band 5 is not used in wide-area specular reflection extraction is that, for a small tooth, the entire tooth is falsely recognized as a specular reflection region.

Figure 3:
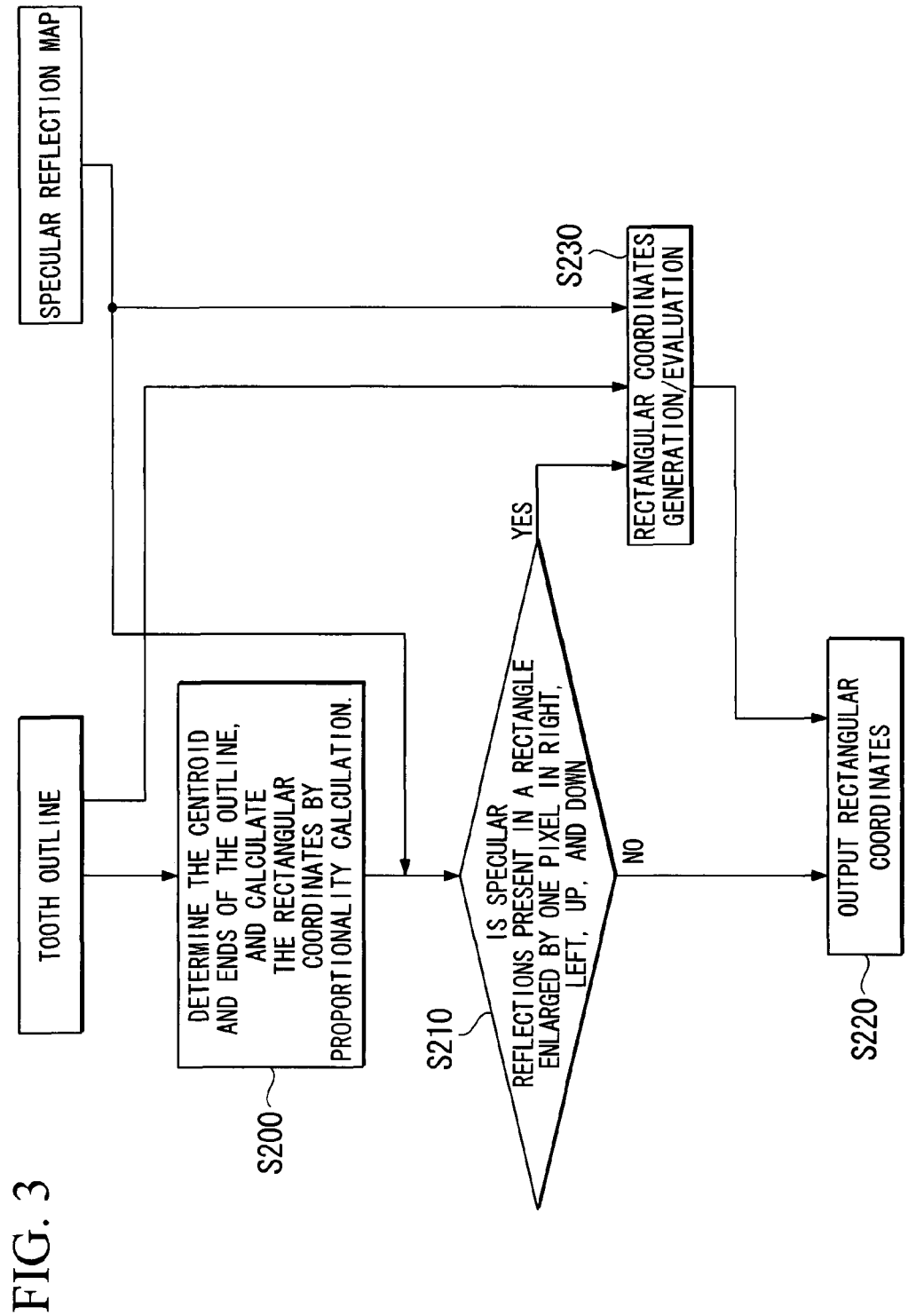
FIG. 3 is an explanatory diagram for explaining the method of setting a rectangular region in accordance with an embodiment of the present invention.
Figure 4:
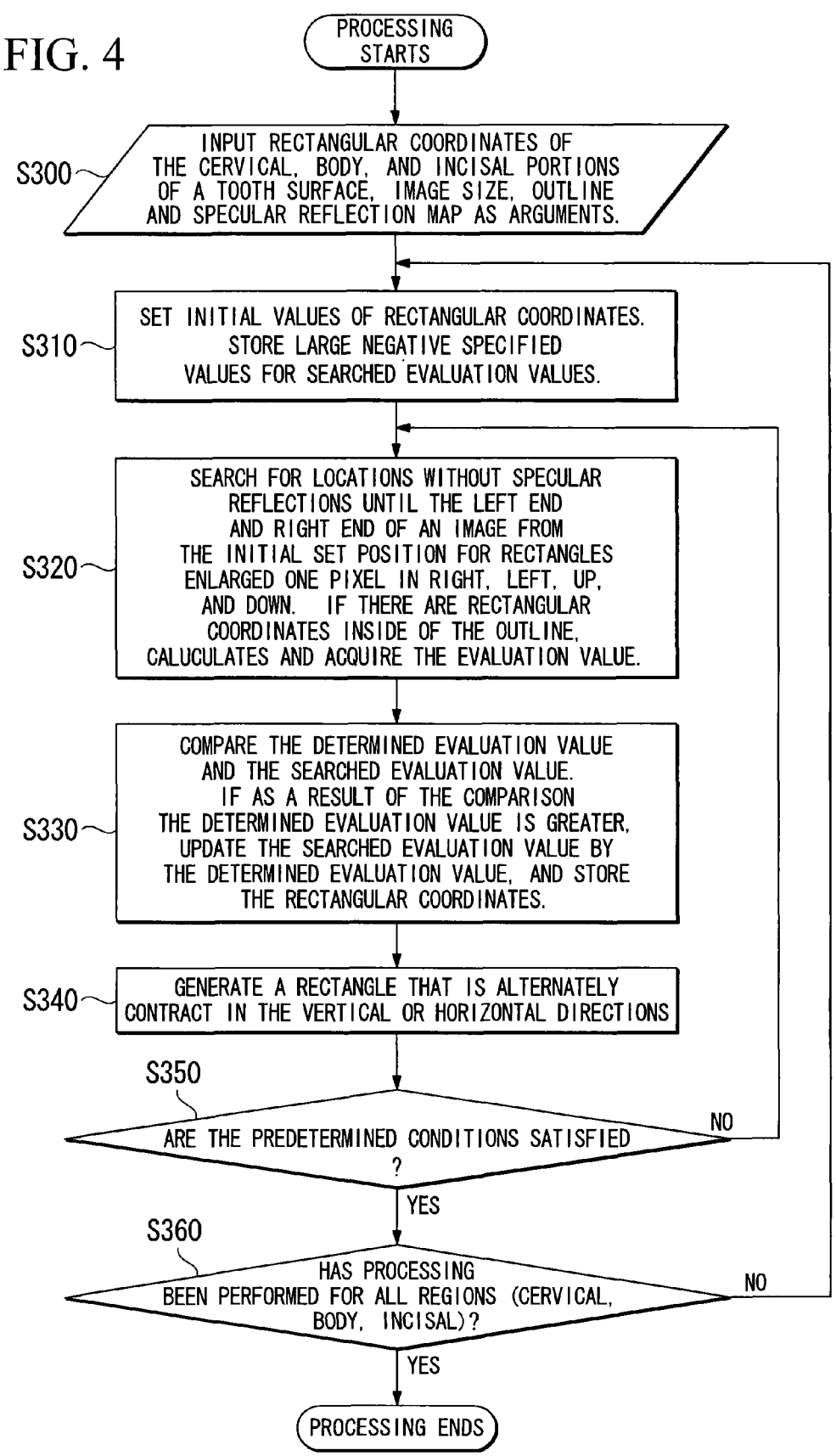
FIG. 4 is a flowchart showing the procedure of searching for a rectangular region in accordance with an embodiment of the present invention.
Figure 5:
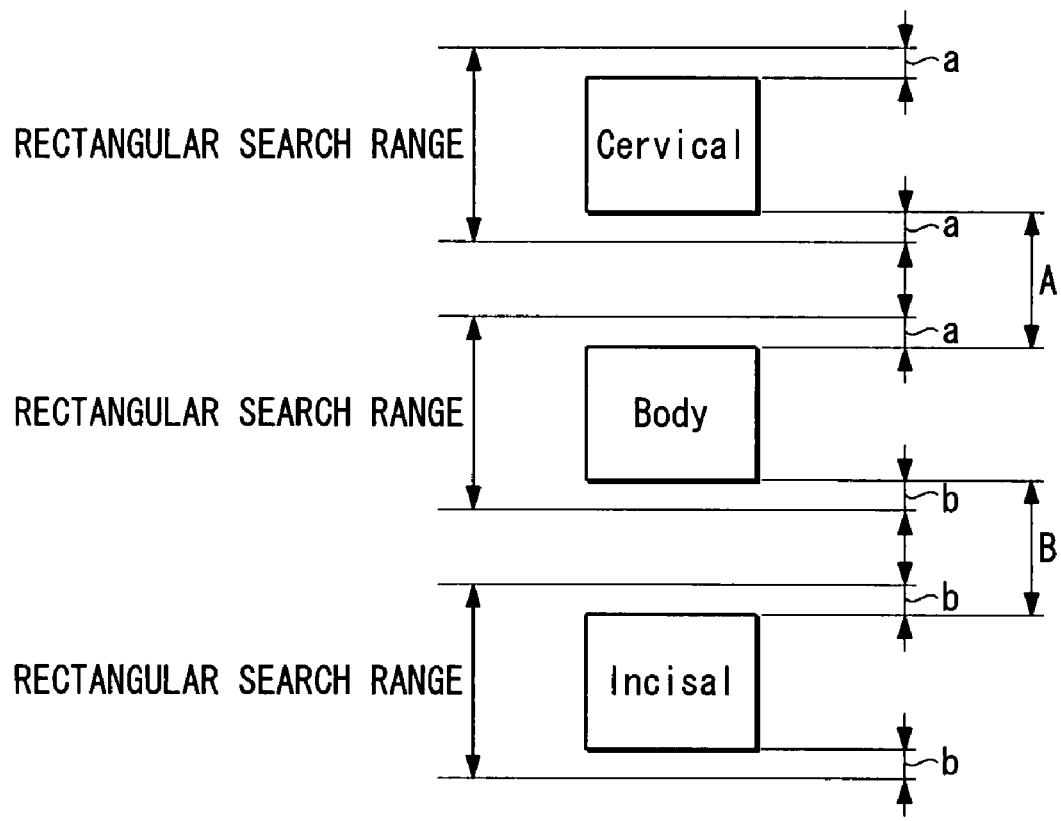
FIG. 5 is a reference drawing for describing a method of setting a rectangular search range in accordance with an embodiment of the present invention.

Next, a method of setting the rectangular region shall be described, referring to FIG. 3 to FIG. 5. The rectangular region setting portion 34 sets rectangular regions so as to avoid specular reflection regions based on the specular reflection map that is generated by the specular reflection region detecting portion 33. First, the centroid and ends of an outline are found based on outline data of a tooth that is detected by the outline detecting portion 32, and rectangular coordinates (position coordinates of the characteristic points of a rectangular region) are calculated by proportionality calculation corresponding to the size of the outline for each of the upper portion, center, and lower portion of a tooth surface (step S200).

Then, a comparison is made between the positions of rectangular regions that are enlargement by 1 pixel each right, left, up, and down within the image of the rectangular regions shown by the calculated rectangular coordinates and the positions of the specular reflection regions that the specular reflection map shows, and a determination is made whether the specular reflection regions are included in the rectangular regions (i.e., whether the rectangle and the specular reflection region overlap) (step S210). Enlarging the rectangular region 1 pixel right, left, up, and down is done to more reliably avoid the specular reflection region. In the case of specular reflection regions not being included in the rectangular regions, the rectangular coordinates calculated in step S200 are output to the chromaticity value calculating portion 35 (step S220).

Also, in the case of specular reflection regions being included in the rectangular regions, an evaluation value is calculated for rectangular regions in which the position and size are changed, and the rectangular coordinates of the rectangular regions having a good evaluation value are determined (step S230). Then, the calculated rectangular coordinates are output to the chromaticity value calculating portion 35 (step S220). The rectangular coordinates of the rectangular region which are the computation object of the evaluation value are generated based on the specular reflection map and the outline data of the tooth.

When generating rectangular coordinates, the rectangular region that is an enlargement by 1 pixel each right, left, up, and down within the image of the rectangular region that the rectangular coordinates calculated in step S200 shows is moved to the left end of the image, and a search is conducted for a place where a specular reflection region is not included in the rectangular region. After determining the rectangular coordinates of a rectangular region that does not include a specular reflection region, it is checked that the rectangular coordinates thus determined are inside of the outline. Similarly, the rectangular region is moved also to the right end of the image and a search is conducted for a location where a specular reflection region is not included in the rectangular region.

Also, the aforedescribed process is performed while contracting the rectangular region. In a series of processes, in the case of a superior evaluation value being obtained that exceeds the predetermined threshold value as the result of calculating an evaluation value, by continuing the search with the search conditions altered, unproductive processing is eliminated.

In the case of contracting the rectangular region, the width or height of a rectangle is contracted by 2 pixels each while ensuring that the centroid position does not change. When initially contracting a rectangle, the long side is contracted among the long side and short side of the rectangle, and the width and height are thereafter alternately contracted. The size of the smallest rectangle is 12×12 pixels. Also, the evaluation value is −1 point for every shift of 1 pixel and −4 points for one contraction calculation. In this way, the setting of the evaluation value is performed giving priority to movement over contraction. The search range is narrowed each time the rectangular coordinates of a rectangular region having an excellent evaluation value are determined.

FIG. 4 shows the details of step S230 in FIG. 3. First, the rectangular coordinates, the image size, the outline, and the specular reflection map of each of the upper, center and lower portions of a tooth surface that are calculated by step S200 are input as arguments (step S300). Then, the rectangular coordinates (input in step S300) that are computed in step S200 of FIG. 3 are set as initial values of the rectangular coordinates. Also, searched evaluation values are prepared, and a negative specific value (having a large absolute value) is stored (step S310).

Then, for rectangles that enlarge a set rectangle one pixel each right, left, up, and down, the rectangular region is moved in turn from an initial set position toward the left end and right end of an image, and a search is conducted for a place where a specular reflection region is not included in the rectangular region. When the rectangular region that is found is inside of the outline, the evaluation value is calculated for each rectangular region (step S320).

The process of comparing the evaluation value that is calculated as described above with searched evaluation values in turn, updating the searched evaluation value with the calculated evaluation value when the calculated evaluation value is greater than the searched evaluation value, and storing the rectangular coordinates in accordance with the calculated evaluation value is performed for all of the calculated evaluation values (step S330). Moreover, the rectangular region is contracted in the vertical direction or horizontal direction (step S340).

Then, a determination is made whether the predetermined conditions have been satisfied (step S350). The predetermined conditions mean that an excellent evaluation value being already obtained and the rectangular size reaching the smallest 12×12 pixels. In the case of either of these conditions being met, the processing proceeds to step S360, and when none of these conditions have been met, the position of the rectangular region returns to the initial set position, and the processing of step S320 is performed again.

In the case of the processing proceeding to step S360, a determination is made whether the abovementioned processing has been performed for all regions of the upper portion, center, and lower portion of a tooth surface (step S360). If there remain regions where the processing has not been performed, the processing of step S310 is performed again. Also, in the case of the abovementioned process being performed for all of the regions, the process of generating rectangular coordinates is ended. Subsequently, the rectangular coordinates that are stored by the step S330 are output to the chromaticity value calculating portion 35.

In the processing mentioned above, although the rectangular region was moved in the horizontal direction of the image, the rectangular region may also be moved in the vertical direction of the image. In this case, the rectangular region is moved in the vertical direction of the image, and at each position of the destination while moving the rectangular region toward the left end and the right end of the image similarly to described above, the optimal rectangular coordinates are found. Note that when moving the rectangular region in the vertical direction of the image, each coordinate search range is set so that locations spaced in the vertical direction from the top edge and lower edge of the initially set rectangle by ¼ of the distance between the rectangles that are initially set in each portion of the tooth surface become boundaries (see FIG. 5), with the rectangular region moving within that range.

As described above, in accordance with the present embodiment, the positions of specular reflection regions are detected based on the data of each pixel that constitutes the image, and based on those positions, the positions and sizes of rectangular regions are set so that the specular reflection regions and the rectangular regions do not overlap. Therefore, it is possible to avoid setting the analysis region in the specular reflection regions. Accordingly, it is possible to measure the color of a tooth that is the object of measurement without being influenced by the specular reflection of light from the subject of photography. Moreover, since pixels in a dark color portion are extracted based on the data of each pixel, when a region that is darker by a cavity or the like exists on a tooth that is the object of measurement, it is possible to exclude such a region from the analysis region as a region that should not be subjected to color measurement.

Also, when the pixel value of each pixel in an image exceeds a threshold value, by detecting that pixels relating to the data as pixels in a specular reflection region, it is possible to detect specular reflection regions by a simple process.

Also, in accordance with the present embodiment, while maintaining the analysis region within a predetermined range or greater, it is possible to automatically avoid setting the measurement region in a specular reflection region of an object. Moreover, since it is not necessary to provide a polarizing plate for removing specular reflection in an imaging device, a decrease in the luminance of an image can be avoided. Therefore, since it is not required to provide a lot of LEDs in the imaging device as light sources in order to raise the luminance, an increase in size and cost of the device can be avoided.

The present invention, based on data of each pixel that constitutes the image, detects the position of a specular reflection region and, based on that position, sets the analysis region. Therefore, the effect is obtained that it is possible to avoid setting the analysis region in a specular reflection region.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. The present invention is not limited to a dental color measuring system, being also applicable to a skin color measuring system, and in other fields color measuring systems that measure the paint color of automobiles or buildings, the spectral characteristics of food, the spectral characteristic of works of art such as paintings or carvings and the like, and dyeing and the like of clothing. Accordingly, the invention is not to be considered as being limited by the foregoing description, and is only limited by the scope of the appended claims.

What is claimed is:

1. An image processor that, based on data of an analysis region in an image, performs analysis processing of the image, the image processor comprising:
   a region detecting portion that, based on data of each pixel of the image, detects a position of a specular reflection region in the image; and
   a region setting portion that, based on the detected position of the specular reflection region, sets the analysis region so that the analysis region and the specular reflection region do not overlap;
   wherein the region setting portion sets the analysis region by moving a predetermined region that is set in advance within the image.

2. An image processor that, based on data of an analysis region in an image, performs analysis processing of the image, the image processor comprising:
   a region detecting portion that, based on data of each pixel of the image, detects a position of a specular reflection region in the image; and
   a region setting portion that, based on the detected position of the specular reflection region, sets the analysis region so that the analysis region and the specular reflection region do not overlap;
   wherein the region setting portion sets the analysis region by altering a size of a predetermined region that is set in advance.

3. The image processor in accordance with claim 1, wherein the region setting portion sets the analysis region by moving and contracting a predetermined region that is set in advance, and gives priority to the movement over the contraction of the predetermined region.

4. An image processor that, based on data of an analysis region in an image, performs analysis processing of the image, the image processor comprising:
   a region detecting portion that, based on data of each pixel of the image, detects a position of a specular reflection region in the image; and
   a region setting portion that, based on the detected position of the specular reflection region, sets the analysis region so that the analysis region and the specular reflection region do not overlap;
   wherein when a value of the data of a pixel exceeds a threshold value, the region detecting portion detects the pixel as a pixel in the specular reflection region;
   wherein the region detecting portion sets the threshold value based on statistics of the data of each pixel; and
   wherein the region detecting portion: (i) performs wide-area specular reflection extraction that calculates a first threshold value based on a standard deviation and average value of all pixel values of the image, and extracts pixels that exceed the first threshold value as pixels in a specular reflection region, (ii) performs small-region specular reflection extraction that calculates a second threshold value based on a standard deviation and average value of pixel values in each small region that is a division of the image, and extracts pixels that exceed the second threshold value as pixels in a specular reflection region, and (iii) performs dark color portion extraction that calculates a third threshold value based on the standard deviation and average value of pixel values in each small region, and extracts pixels that do not exceed the third threshold value.

5. The image processor in accordance with claim 1, further comprising a chromaticity value calculating portion that calculates a chromaticity in the analysis region.

6. A color measuring system comprising:
   an imaging device that sequentially irradiates illumination light of at least four types of wavelength bands and captures photographic subject spectral images of a number corresponding to a number of the types of wavelength bands; and
   an image processor that, based on data of an analysis region in the photographic subject spectral images, performs analysis processing of the photographic subject spectral images,
   wherein the image processor comprises:
      a region detecting portion that, based on data of pixels of the photographic subject spectral images, detects a position of a specular reflection region in the photographic subject spectral images, and
      a region setting portion that, based on the detected position of the specular reflection region, sets the analysis region so that the analysis region and the specular reflection region do not overlap;

wherein the region setting portion sets the analysis region by moving a predetermined region that is set in advance within the image.

7. The color measuring system in accordance with claim 6, wherein when a value of the data of a pixel exceeds a threshold value, the region detecting portion detects the pixel as a pixel in the specular reflection region.

8. An image processing method for performing analysis processing of an image based on data of an analysis region in the image, the method comprising:
   a region detecting process that, based on data of each pixel of the image, detects a position of a specular reflection region in the image;
   a region setting process that, based on the detected position of the specular reflection region, sets the analysis region so that the analysis region and the specular reflection region do not overlap; and
   an image analysis process that, using an image processor, performs the analysis processing of the image based on the data of the set analysis region;
   wherein the region setting process sets the analysis region by moving a predetermined region that is set in advance within the image.

9. The image processing method in accordance with claim 8, wherein when a value of the data of a pixel exceeds a threshold value, the pixel is detected as a pixel in the specular reflection region.

10. A color measuring method comprising:
   an imaging process that, using an imaging device, sequentially irradiates illumination light of at least four types of wavelength bands and captures photographic subject spectral images of a number corresponding to a number of the types of wavelength bands; and
   an image processing process that, based on data of an analysis region in the photographic subject spectral images, uses an image processor to perform analysis processing of the photographic subject spectral images,
   wherein the image processing process comprises:
      a region detecting process that, based on data of pixels of the photographic subject spectral images, detects a position of a specular reflection region in the photographic subject spectral images, and
      a region setting process that, based on the detected position of the specular reflection region, sets the analysis region so that the analysis region and the specular reflection region do not overlap;
   wherein the region setting process sets the analysis region by moving a predetermined region that is set in advance within the image.

11. A non-transitory computer readable medium storing a program that causes an image processor to execute analysis processing of an image based on data of an analysis region in the image, the analysis processing comprising:
   detecting a position of a specular reflection region in the image, based on data of each pixel of the image; and
   setting the analysis region, based on the detected position of the specular reflection region, so that the analysis region and the specular reflection region do not overlap;
   wherein the analysis region is set by moving a predetermined region that is set in advance within the image.

12. The non-transitory computer readable medium in accordance with claim 11, wherein when a value of the data of a pixel exceeds a threshold value, the pixel is determined to be in the specular reflection region.

* * * * *